Nov. 23, 1965  TATSUYA ICHIHARA  3,218,855
POSITION CONTROL TYPE MASS FLOW METER
Filed June 12, 1962
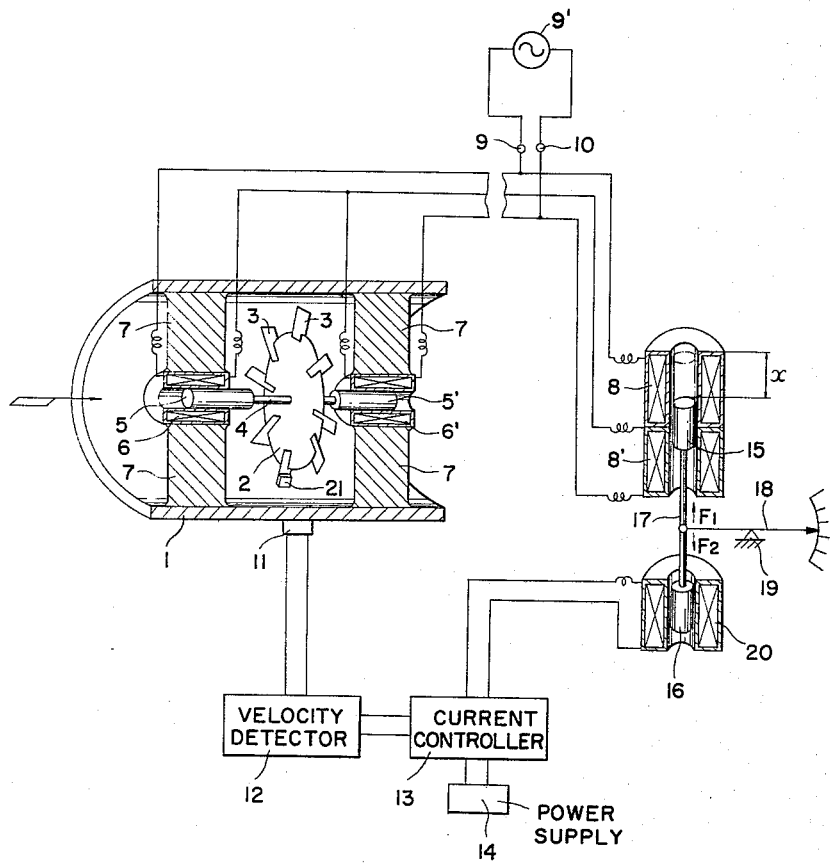
INVENTOR.
TATSUYA ICHIHARA
BY Arthur H. Swanson
ATTORNEY.

United States Patent Office 3,218,855
Patented Nov. 23, 1965

3,218,855
POSITION CONTROL TYPE MASS FLOW METER
Tatsuya Ichihara, Tokyo, Japan, assignor to Honeywell Inc., a corporation of Delaware
Filed June 12, 1962, Ser. No. 201,944
Claims priority, application Japan, June 12, 1961, 36/20,269
1 Claim. (Cl. 73—231)

This invention relates to a mass flow meter, and more particularly this invention is directed to a mass flow meter which detects and measures a fluid having mass $m$ and flow velocity $v$ in the form represented by mass flow $mv$. The mass flow of a fluid is obtained in the mass flow meter provided in accordance with this invention in the following way: a vane with induction coils and inclined blades is provided in a fluid to be measured, and the displacement of the vane in the direction of the fluid flow is detected and at the same time the flow velocity of the fluid is fed-back so that the mass flow of the fluid is determined by the point at which the detected value of the displacement of the vane and the fed-back value of the flow velocity are kept in balance. It is an object of this invention to provide a mass flow meter in which the mass flow of a fluid is obtained in the form of the product of mass $m$ and flow velocity $v$.

It is another object of this invention to provide a mass flow meter in which the detected value of the displacement of a vane located in a fluid to be measured and the fed-back value of the flow velocity of the same fluid are balanced so that the mass flow of the fluid is determined.

These objects will become apparent when full consideration is undertaken of the present specification and the single drawing, in which:

The single figures is a skeleton diagram explaining an embodiment of the mass flow meter provided according to this invention.

In the single figure, a vane 2 with a plurality of inclined blades 3 is provided in casing 1 with a pair of flow guides 7. Flow guides 7 direct a fluid flow to be measured in the direction of the rotating axle 4 of vane 2. A pair of iron cores 5 and 5' is provided at both ends of rotating axle 4 and is inserted respectively into a pair of induction coils 6 and 6' so that iron cores 5 and 5' are easily moved in the axial direction of induction coils 6 and 6'. The other pair of induction coils 8 and 8' is connected to induction coils 6 and 6' respectively. An iron core 15 is inserted into induction coils 8 and 8' and corresponds to the displacements of iron cores 5 and 5'. A pair of terminals 9 and 10 provided on the connection line between induction coils 6, 6' and 8, 8' is connected to an electrical power supply 9' as shown in the drawing. The pair of induction coils 6 and 6' is fixedly mounted into each of the openings provided in the center of the pair of flow guides 7. A permanent magnet 21 is provided on one of inclined blades 3. A sending coil 11 is connected to a solenoid coil 20 through a detecting apparatus 12 for the flow velocity and a controlling apparatus 13 for an electrical power supply 14. An iron core 16 inserted into solenoid coil 20 is connected to iron core 15 by means of a connecting rod 17. An indicator 18 is provided on connecting rod 17 and indicates the displacement of iron core 15 utilizing fulcrum 19.

The operation of the mass flow meter provided in accordance with this invention is explained as follows: Assuming that a fluid, a mass flow thereof to be detected and measured, is directed from the leftside to the rightside as shown in the drawing, then vane 2 rotates in proportion to the flow velocity $v$ of the fluid and a lateral thrust in proportion to the product of mass $m$ and the square of flow velocity $v$, $mv^2$, is generated rightwards. Both iron cores 5 and 5' rotate in proportion to flow velocity $v$ within induction coils 6 and 6' respectively and tend to displace in the direction of the fluid flow under the lateral thrust proportional to the product $mv^2$. The displacement in the axial direction of inductance coils 6 and 6' is reproduced by the displacement of iron core 15 in the axial direction of inductance coils 8 and 8', the constructions thereof being the same as that of inductance coils 6 and 6'. When the displacement of iron core 15 is controlled by a controlling quantity fed back from the signal generated by sending coil 11 through detecting means 12 and controlling apparatus 13 to solenoid coil 20, indicator 18 indicates the mass flow then at its rest point in a state of equilibrium.

It is assumed that the force which is transferred from induction coils 6 and 6' to induction coils 8 and 8' is respresented by $F_1$ and the force which controls force $F_1$ is represented by $F_2$, forces $F_1$ and $F_2$ are given as follows:

$$F_1 = K_1 mv^2$$
$$F_2 = K_2 xv$$

where:

$x$ = the displacement of the combined iron cores 15 and 16
$K_1$ = proportional constant
$K_2$ = proportional constant If electrical power supply 14 is adjusted by means of controlling apparatus 13 so that force $F_2$ generated by solenoid coil 20 is equal to force $F_1$ generated by induction coils 8 and 8', the following formulae are given:

$$F_1 = F_2$$
$$K_1 mv^2 = K_2 xv$$

therefore $$x = K_3 mv$$

where $K_3$ = proportional constant.

In conclusion, displacement $x$ represents mass flow $mv$ and the instant value of mass flow $mv$ can be read out by the scale to which indicator 18 is set.

It should be understood that the embodiment herewith shown and described is the form of the invention at present preferred, but that the scope of the invention is not limited to the precise details of construction herein shown but is to be ascertained by reference to the appended claim.

What is claimed is:

A mass flow meter having a vane provided with inclined blades and an axis, supporting means for supporting said vane within a fluid flowing along a path, with said axis in parallel with said path, to permit the flow of fluid along said path both to rotate said vane about its axis at a speed dependent upon the rate of the fluid flow, and to displace said vane along its axis in the direction of the fluid flow by an amount dependent upon that of the thrust exerted by the fluid flow on said vane, induction coil means coupled to said vane and responsive to said axial displacement of said vane to provide a first effect dependent upon the magnitude of said displacement, rotation sensing means coupled to said vane and responsive to its said rotation to provide a second effect dependent upon the speed of said rotation, and means for opposing and balancing said first and second effects and for determining the balance point between them as a measure of the mass flow of the fluid.

References Cited by the Examiner

UNITED STATES PATENTS

| | | | |
|---|---|---|---|
| 720,188 | 2/1903 | Seidener | 73—194 |
| 2,662,540 | 12/1953 | Rutherford et al. | 73—205 |
| 2,870,634 | 1/1959 | Gehre | 73—230 |
| 2,975,635 | 3/1961 | Kindler et al. | 73—231 X |

RICHARD C. QUEISSER, *Primary Examiner.*

ROBERT EVANS, *Examiner.*